US012804704B2

(12) United States Patent
Miao et al.

(10) Patent No.: US 12,804,704 B2
(45) Date of Patent: Nov. 17, 2026

(54) INFORMATION COMMUNICATION METHOD AND APPARATUS

(71) Applicant: DATANG MOBILE COMMUNICATIONS EQUIPMENT CO., LTD., Beijing (CN)

(72) Inventors: Jinhua Miao, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 316 days.

(21) Appl. No.: 18/262,191

(22) PCT Filed: Jan. 26, 2022

(86) PCT No.: PCT/CN2022/073960
§ 371 (c)(1),
(2) Date: Jul. 19, 2023

(87) PCT Pub. No.: WO2022/161388
PCT Pub. Date: Aug. 4, 2022

(65) Prior Publication Data
US 2024/0098776 A1 Mar. 21, 2024

(30) Foreign Application Priority Data
Jan. 28, 2021 (CN) ......................... 202110117729.7

(51) Int. Cl.
*H04W 74/00* (2009.01)
*H04W 12/037* (2021.01)
(Continued)

(52) U.S. Cl.
CPC ....... *H04W 74/004* (2013.01); *H04W 12/037* (2021.01); *H04W 74/0833* (2013.01); *H04W 74/0836* (2024.01); *H04W 74/0838* (2024.01)

(58) Field of Classification Search
CPC ............. H04W 74/004; H04W 12/037; H04W 74/0833; H04W 74/0836; H04W 74/0838; H04W 28/065; H04W 74/002
(Continued)

(56) References Cited

U.S. PATENT DOCUMENTS

2017/0367120 A1* 12/2017 Murray ............... H04W 72/046
2018/0270894 A1* 9/2018 Park ...................... H04W 76/27
2018/0359802 A1* 12/2018 Cho ...................... H04W 76/22
2019/0053157 A1 2/2019 Lin et al.
(Continued)

FOREIGN PATENT DOCUMENTS

CN 108811099 A 11/2018
CN 112242893 A * 1/2021 ........... H04L 5/0053
(Continued)

OTHER PUBLICATIONS

Huawei et al., "Down-selection of IDLE Mode Measurement Report alternatives for fast SCell set-up", 3GPP TSG-RAN WG2 Meeting #99, Berlin, German, Aug. 21-25, 2017, total 5 pages, R2-1708547.
(Continued)

*Primary Examiner* — Nicholas A Jensen
*Assistant Examiner* — Oladiran Gideon Olaleye
(74) *Attorney, Agent, or Firm* — KILPATRICK TOWNSEND & STOCKTON LLP

(57) ABSTRACT

An information communication method and apparatus are disclosed. The information communication method includes: a terminal determines a first parameter, where the first parameter is used to indicate a service delay requirement and/or a delay jitter requirement of the terminal; and the terminal sends the first parameter through a random access uplink message.

14 Claims, 5 Drawing Sheets

(51) Int. Cl.
*H04W 74/0833* (2024.01)
*H04W 74/0836* (2024.01)
*H04W 74/0838* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 2019/0166553 | A1 | 5/2019 | Ryoo et al. | |
| 2019/0379431 | A1* | 12/2019 | Park | H04B 7/0408 |
| 2021/0076450 | A1 | 3/2021 | Jiang et al. | |
| 2022/0322127 | A1* | 10/2022 | Sha | H04W 24/10 |
| 2022/0369368 | A1* | 11/2022 | Sedin | H04W 72/20 |
| 2023/0049998 | A1* | 2/2023 | Li | H04W 72/1268 |
| 2023/0189055 | A1* | 6/2023 | Tooher | H04W 28/0268 370/328 |

FOREIGN PATENT DOCUMENTS

| | | | | |
|---|---|---|---|---|
| WO | WO-2017123004 | A1 * | 7/2017 | H04W 36/144 |
| WO | WO-2018174656 | A1 * | 9/2018 | H04W 74/0833 |
| WO | 2019237927 | A1 | 12/2019 | |

OTHER PUBLICATIONS

CATT,"RAN enhancements based on new QoS", 3GPP TSG-RAN WG2 Meeting #112-e, Online, Nov. 2-13, 2020, total 6 pages, R2-2008861.

Lenovo et al., "Discussion on the support of survival time", 3GPP TSG-RAN WG2 Meeting #113 electronic, E-meeting, Jan. 25-Feb. 5, 2021, total 4 pages, R2-2100922.

Ericsson, "Signaling of random access parameters [M063]", 3GPP TSG-RAN WG2 #101, Tdoc R2-1803675, Agenda Item 10.4.3.2, Athens, Greece, Feb. 26-Mar. 2, 2018.

* cited by examiner

INFORMATION COMMUNICATION METHOD AND APPARATUS

CROSS-REFERENCE TO RELATED APPLICATIONS

The present application is a US National Stage of International Application No. PCT/CN2022/073960, filed on Jan. 26, 2022, which claims priority to Chinese Patent Application No. 202110117729.7, filed with the China National Intellectual Property Administration on Jan. 28, 2021 and entitled "Information Transmission Method and Apparatus", which is hereby incorporated by reference in its entirety.

FIELD

The present application relates to the field of communication technologies, and particularly to an information communication method and apparatus.

BACKGROUND

In a current communication mechanism, a terminal needs to be in a connected state to report content related to service characteristics, such as through a terminal assistance information message or Non-Access-Stratum (NAS) signaling, for example, notify a network side through a service request message.

When reporting in the connected state, following influence factors are mainly considered:

for example, a size of uplink grant, for example, a size of message 3 (MSG3) is not enough to bear the signaling.

or security issues, for example, the terminal assistance information is a Radio Resource Control (RRC) message and needs encryption and integrity protection, to prevent other devices from intercepting and illegally using the terminal assistance information.

However, for Industrial Internet of Things (IIoT) services, if these parameters are reported after entering the RRC connection state, a service delay impact may be caused.

SUMMARY

Embodiments of the present application provide an information communication method and apparatus, to reduce the service delay.

On a terminal side, an information communication method according to an embodiment of the present application includes:

determining, by a terminal, a first parameter, where the first parameter is used to indicate a service delay requirement and/or a delay jitter requirement of the terminal;

sending, by the terminal, the first parameter through a random access uplink message.

Through this method, the terminal determines the first parameter, where the first parameter is used to indicate the service delay requirement and/or delay jitter requirement of the terminal; and the terminal sends the first parameter through the random access uplink message, to reduce the service delay.

In one embodiment, the first parameter includes one or a combination of:

burst spread, delay jitter, a service characteristic, or energy-saving preference of the terminal.

In one embodiment, the random access uplink message is a Media Access Control Control Element (MAC CE) or a Radio Resource Control (RRC) message.

In one embodiment, the random access uplink message includes a mapping between Logical Channel (LCH) information and the first parameter, or a mapping between Data Resource Bearer (DRB) information and the first parameter.

In one embodiment, the first parameter is sent when an instruction to report the first parameter sent by a network side is received, where the instruction is carried by a broadcast message or an RRC Release message.

In one embodiment, the first parameter is sent when a size of a current random access uplink message is capable of bearing the first parameter.

In one embodiment, when a size of a current random access uplink message is not capable of bearing the first parameter, the method further includes:

sending a Buffer Status Report (BSR) through the random access uplink message;

or, segmenting the first parameter to obtain a first parameter segment, and sending the first parameter segment through the random access uplink message;

or, sending the BSR and the first parameter segment obtained after segmenting the first parameter through the random access uplink message.

In one embodiment, before sending the first parameter, the method further includes:

when a network side reserves a Physical Random Access Channel (PRACH) resource for the first parameter, selecting a preamble or PRACH slot or Message A (MSGA) resource in the reserved PRACH resource to send data.

In one embodiment, the method further includes: receiving a security parameter carried by a network side in an RRC Release message;

encrypting the random access uplink message through the security parameter, and then sending the encrypted random access uplink message to the network side.

In one embodiment, the first parameter is determined when a preset DRB arrives.

In one embodiment, the random access uplink message includes an MSG3 or MSGA.

In one embodiment, the terminal determines the first parameter in an RRC idle state (IDLE) or inactive state (inactive).

Correspondingly, on the network side, an information communication method according to an embodiment of the present application includes:

receiving a random access uplink message;

obtaining a first parameter from the random access uplink message, where the first parameter is used to indicate a service delay requirement and/or a delay jitter requirement of a terminal.

In one embodiment, the first parameter includes one or a combination of:

burst spread, delay jitter, a service characteristic, or energy-saving preference of the terminal.

In one embodiment, the method further includes: receiving a BSR through the random access uplink message, or receiving the BSR and a first parameter segment through the random access uplink message.

In one embodiment, the first parameter obtained from the random access uplink message is a segmented first parameter.

In one embodiment, the method further includes:

reserving a PRACH resource for the first parameter;

receiving data through a preamble or PRACH slot or MSGA resource in the reserved PRACH resource.

In one embodiment, the method further includes:

sending a security parameter through an RRC Release message, and the terminal encrypts the random access uplink message through the security parameter.

In one embodiment, before receiving the random access uplink message, the method further includes:

sending a preset DRB, and triggering the terminal to send the first parameter through the random access uplink message.

In one embodiment, the random access uplink message includes an MSG3 or MSGA.

On the terminal side, an information communication apparatus according to an embodiment of the present application includes: a memory and a processor, where the memory is configured to store program instructions, and the processor is configured to invoke the program instructions stored in the memory and perform in accordance with an obtained program:

determining a first parameter, where the first parameter is used to indicate a service delay requirement and/or a delay jitter requirement of a terminal;

sending the first parameter through a random access uplink message.

In one embodiment, the first parameter includes one or a combination of:

burst spread, delay jitter, a service characteristic, or energy-saving preference of the terminal.

In one embodiment, the random access uplink message is an MAC CE or RRC message.

In one embodiment, the random access uplink message includes a mapping between LCH information and the first parameter, or a mapping between DRB information and the first parameter.

In one embodiment, the first parameter is sent when an instruction to report the first parameter sent by a network side is received, where the instruction is carried by a broadcast message or an RRC Release message.

In one embodiment, the first parameter is sent when a size of a current random access uplink message is capable of bearing the first parameter.

In one embodiment, when a size of a current random access uplink message is not capable of bearing the first parameter, the processor is further configured to:

send a BSR through the random access uplink message;

or, segment the first parameter to obtain a first parameter segment, and send the first parameter segment through the random access uplink message;

or, send the BSR and the first parameter segment obtained after segmenting the first parameter through the random access uplink message.

In one embodiment, before sending the first parameter, the processor is further configured to:

when a network side reserves a PRACH resource for the first parameter, select a preamble or PRACH slot or MSGA resource in the reserved PRACH resource to send data.

In one embodiment, the processor is further configured to: receive a security parameter carried by a network side in an RRC Release message;

encrypt the random access uplink message through the security parameter, and then send the encrypted random access uplink message to the network side.

In one embodiment, the first parameter is determined when a preset DRB arrives.

In one embodiment, the random access uplink message includes an MSG3 or MSGA.

On the network side, an information communication apparatus according to an embodiment of the present application includes: a memory and a processor, where the memory is configured to store program instructions, and the processor is configured to invoke the program instructions stored in the memory and perform in accordance with an obtained program:

receiving a random access uplink message;

obtaining a first parameter from the random access uplink message, where the first parameter is used to indicate a service delay requirement and/or a delay jitter requirement of a terminal.

In one embodiment, the first parameter includes one or a combination of:

burst spread, delay jitter, a service characteristic, or energy-saving preference of the terminal.

In one embodiment, the random access uplink message is an MAC CE or RRC message.

In one embodiment, the random access uplink message includes a mapping between LCH information and the first parameter, or a mapping between DRB information and the first parameter.

In one embodiment, the processor is further configured to: receive a BSR through the random access uplink message, or receive the BSR and a first parameter segment through the random access uplink message.

In one embodiment, the first parameter obtained from the random access uplink message is a segmented first parameter segment.

In one embodiment, the processor is further configured to:

reserve a PRACH resource for the first parameter;

receive data through a preamble or PRACH slot or MSGA resource in the reserved PRACH resource.

In one embodiment, the processor is further configured to:

send a security parameter through an RRC Release message, and the terminal encrypts the random access uplink message through the security parameter.

In one embodiment, before receiving the random access uplink message, the processor is further configured to:

send a preset DRB, and trigger the terminal to send the first parameter through the random access uplink message.

In one embodiment, the random access uplink message includes an MSG3 or MSGA.

On the terminal side, another information communication apparatus provided by an embodiment of the present application includes:

a determining device configured to determine a first parameter, where the first parameter is used to indicate a service delay requirement and/or a delay jitter requirement of a terminal;

a sending device configured to send the first parameter through a random access uplink message.

On the network side, another information communication apparatus provided by an embodiment of the present application includes:

a receiving device configured to receive a random access uplink message;

an obtaining device configured to obtain a first parameter from the random access uplink message, where the first parameter is used to indicate a service delay requirement and/or a delay jitter requirement of a terminal.

Another embodiment of the present application provides a computing device, including a memory and a processor, where the memory is configured to store program instructions, and the processor is configured to invoke the program instructions stored in the memory and perform any one of the above-mentioned methods in accordance with an obtained program.

Another embodiment of the present application provides a computer storage medium storing computer executable instructions, where the computer executable instructions are configured to cause a computer to perform any one of the above-mentioned methods.

BRIEF DESCRIPTION OF DRAWINGS

In order to illustrate the embodiments of the present application more clearly, accompanying drawings that need to be used in describing embodiments will be introduced below briefly. The accompanying drawings described below are only some embodiments of the present application, and other accompanying drawings can also be obtained according to these accompanying drawings.

DETAILED DESCRIPTION OF EMBODIMENTS

Figure 1:
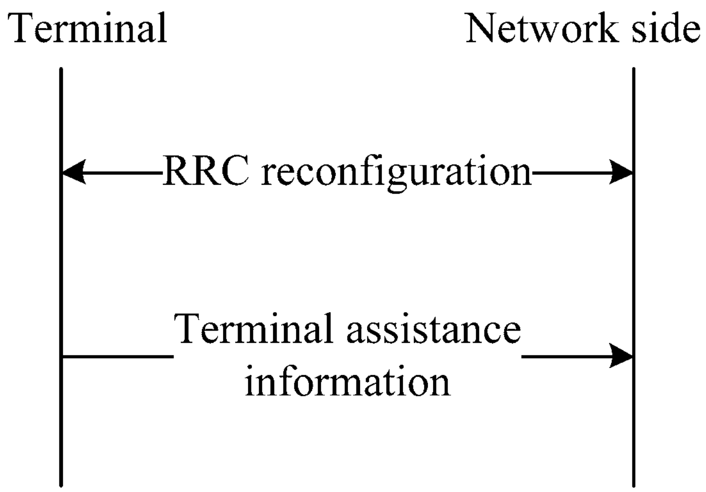
FIG. 1 is a schematic diagram of a process of reporting terminal auxiliary information according to an embodiment of the present application.

The embodiments of the present application will be described clearly and completely below in combination with the accompanying drawings in embodiments of the present application. The described embodiments are only a part of embodiments of the present application but not all embodiments.

Embodiments of the present application provide an information communication method and apparatus, to reduce the service delay.

Here, the method and apparatus are based on the same application concept. Since the principle of the method to solve the problem is similar to that of the apparatus, implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, and the wireless terminal device exchanges the voice and/or data with the radio access network. For example, the wireless terminal device may be a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal device may also be called as a system, a subscriber device, a subscriber station, a mobile station, mobile, a remote station, an access point, a remote terminal, an access terminal, a user terminal, a user agent, a user device, which is not limited in embodiments of the present application.

The network device involved in embodiments of the present application may be a base station, and the base station may include cells. Depending on specific application scenarios, the base station may also be called as an access point, or may refer to a device in an access network communicating with the wireless terminal via one or more sectors over the air interface or other names. The network device may be used to perform inter-conversion between a received air frame and Internet Protocol (IP) packet, and used as a router between the wireless terminal device and the rest of the access network, where the rest of the access network may include IP networks. The network device may further coordinate attribute management of the air interface. For example, the network device involved in embodiments of the present application may be a network device (Base Transceiver Station (BTS)) in the Global System of Mobile communication (GSM) or Code Division Multiple Access (CDMA), or may be a network device (NodeB) in the Wideband Code Division Multiple Access (WCDMA), or may be an evolutional network device (evolutional Node B (eNB or e-NodeB)) in the Long Term Evolution (LTE) system, a 5G base station in the 5G network architecture (next generation system), or may be a Home evolved Node B (HeNB), a relay node, femto, pico, etc., which is not limited in embodiments of the present application.

Embodiments of the present application will be described below in detail with reference to the drawings of the specification. It should be noted that a showing order of embodiments of the present application only represents a sequential order of embodiments, but does not represent pros and cons of the embodiments.

A process of reporting terminal assistance information refers to FIG. 1. In the New Rat (NR), the terminal sends desired preference (for example, whether to reduce bandwidth, whether to save energy, etc.) to the network side through a terminal assistance information message.

Of course, service characteristics, such as service cycle, data volume and the like, may also be sent through the terminal assistance information message.

The terminal assistance information is carried on Signaling Radio Bearer (SRB) 1 or SRB3, and is a signaling message sent to the network side after the terminal enters the RRC connection state.

With regard to reporting of a service request, after the terminal triggers a service, the terminal may send a service request message to report a type of a current service to the network side. For example, whether the service is an emergency service, whether the service is signaling or whether the service is an access with a higher priority, etc. However, the terminal also needs to enter the RRC connection state before reporting to the network side.

Figure 2:
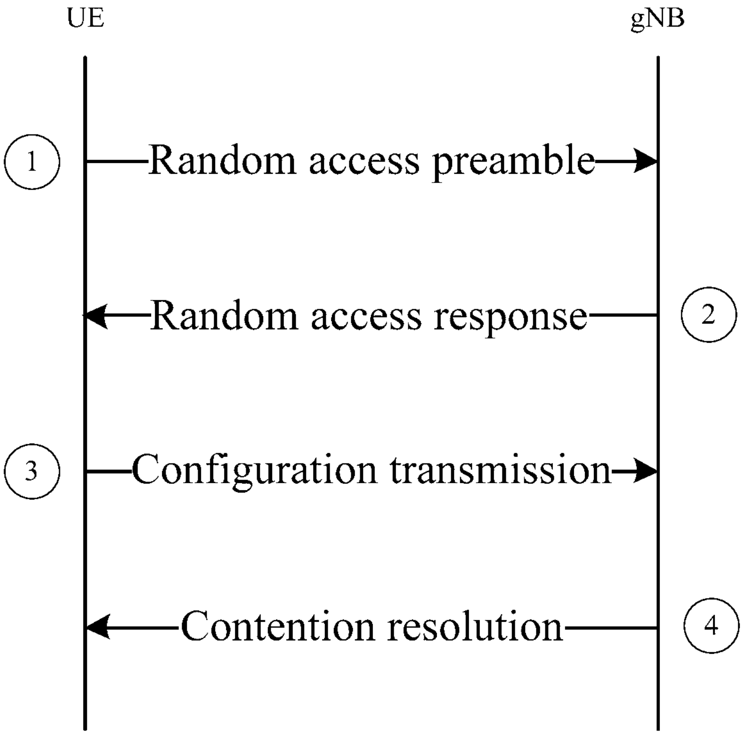
FIG. 2 is a schematic diagram of a contention random access process according to an embodiment of the present application.

A contention random access process refers to FIG. 2. The NR defines two random access processes, namely non-contention random access process and contention random access process. The contention random access process is mainly introduced here.

The contention random access process is mainly divided into 4 steps.

Step 1: A terminal selects a preamble and sends the preamble.

Step 2: The terminal receives a Message 2 (Msg2), i.e., a Random Access Response (RAR), sent by a base station, where the Msg2 includes uplink (UL) grant information.

Step 3: The terminal sends an Msg3 on the UL grant included in the Msg2. It should be noted here that the Msg3 is transmitted through a Hybrid Automatic Repeat reQuest (HARQ) process, and an ID of the HARQ process is fixed at 0.

During UL transmission, if the terminal receives the UL grant included in the RAR and if there is data in a Msg3 cache, a Media Access Control (MAC) Protocol Data Unit (PDU) may be obtained from the Msg3.

Figure 3:
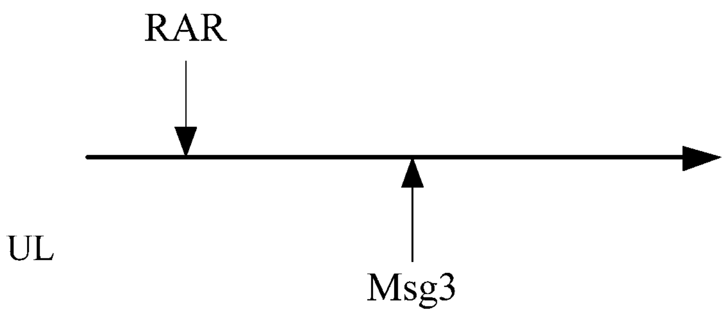
FIG. 3 is a schematic diagram of a process of sending Msg3 according to an embodiment of the present application.

At the same time, a data packet is put in a HARQ cache, a physical layer is instructed to execute a sending process according to UL grant information. A process of sending the Msg3 is shown in FIG. 3.

Step 4: The terminal receives an Msg4.

Figure 4:
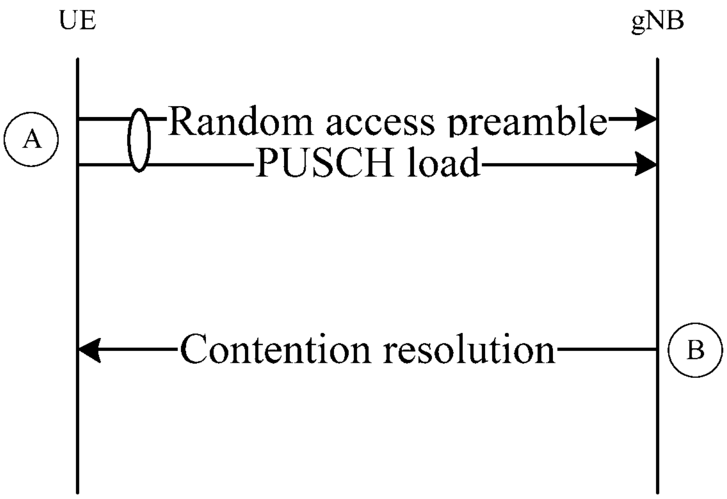
FIG. 4 is a schematic diagram of a random access process according to an embodiment of the present application.

Two-step Random Access (2-step RA) process is shown in FIG. 4, including following steps.

Step 1: The terminal sends a preamble and an uplink Physical Uplink Shared Channel (PUSCH) in an MSGA, where a PUSCH resource may be notified by a broadcast message, and a Message B (MSGB) window is opened.

Step 2: The terminal receives an MSGB during runtime of the MSGB window. When the RRC is initially established, the MSGB may be a success Random Access Response (RAR), or a fallback RAR. If the network side successfully receives the MSGA, that is, successfully receives the preamble and PUSCH in Step 1, the network side feeds back the success RAR.

If the network side only receives the preamble, the network side feeds back the fallback RAR.

The 5G system is integrated with industrial Internet.

The Industrial Internet adopts Time Synchronization Network (TSN). As a typical deterministic network, the Industrial Internet has precise control over arrival and transmission of service data, thus realizing accurate resource allocation and transmission. The 5G system is integrated in a form of bridge in IEEE TSN.

The 5GS (5G System) is internally synchronized through a 5G clock, and the TSN network is synchronized through a TSN network clock. A node for 5GS and TSN clock conversion is a Device-side TSN Translator (DS-TT) on the terminal side, and is a Network-side TSN Translator (NW-TT) on the network side. In a time conversion process, delay jitter may be produced from an external network to the 5GS, including followings.

Terminal side: the delay jitter between a TSN bridge and the DS-TT, and the delay jitter between the DS-TT and the terminal, where the DS-TT may be integrated with the terminal without delay jitter, and this delay jitter is called uplink delay jitter.

Network side: the delay jitter of an N6 interface from a Data Network (DN) to a User Plane Function (UPF) entity (an interface between the DN and UPF entity), assuming that the NW-TT and UPF are integrated without delay jitter. The delay jitter introduced by the N6 interface is called downlink burst spread (DL Burst Spread). After the core network calculates DL Burst Spread, the core network may send the DL Burst Spread together with parameters such as downlink data arrival time and cycle to the base station through TSC Assistance Information (TSCAI), and the base station schedules and transmits the downlink data accordingly to realize deterministic transmission of the downlink data.

However, there is currently no solution for the uplink delay jitter on the terminal side.

Under the IIoT service, the delay requirement is relatively high. If parameters such as Burst spread are reported when entering the RRC connection state, the service transmission delay may be increased. Therefore, it is necessary to optimize the process of reporting parameters or preferences by the terminal.

Therefore, embodiments of the present application propose followings.

A terminal reports a first parameter in a random access uplink message (such as MSG3 or MSGA).

The first parameter may include, for example, one or more of Burst spread or delay jitter, a service characteristic, or energy-saving preference of the terminal, etc.

In one embodiment, the random access uplink message is an MAC CE or RRC message.

Figure 5:
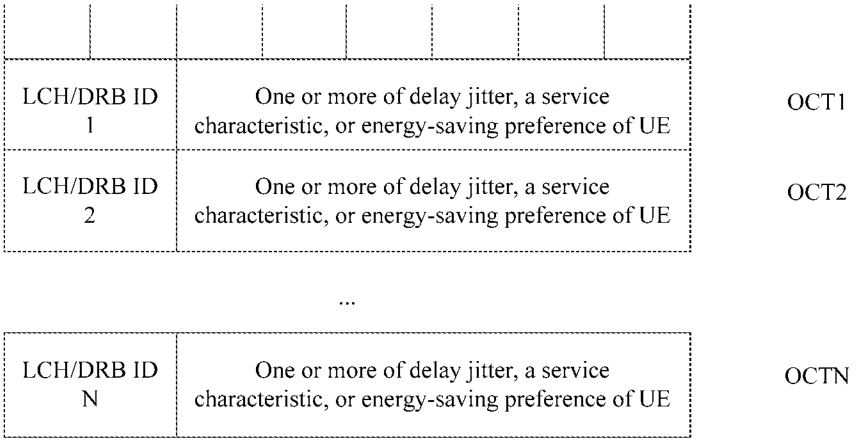
FIG. 5 is a schematic diagram of a mapping between LCH information or DRB information and a first parameter according to an embodiment of the present application.

In one embodiment, referring to FIG. 5, the random access uplink message includes a mapping between LCH information or DRB information and the first parameter.

In one embodiment, the terminal determines whether to report the first parameter according to a network-side instruction.

In one embodiment, the network-side instruction may be carried in a broadcast message, that is, information indicating whether the terminal reports the first parameter is added in the broadcast message.

In one embodiment, the network-side instruction may also be an RRC release message.

In one embodiment, before reporting the first parameter, the terminal determines whether a size of a current MSG3/MSGA is capable of bearing the first parameter; if the size of the current MSG3/MSGA is capable of bearing the first parameter, the terminal sends the first parameter; if the size of the current MSG3/MSGA is not capable of bearing the first parameter, the terminal may carry a BSR in the MSG3/MSGA or segment the first parameter; that is, a complete data packet was sent previously, but now the data packet is segmented. It should be noted that the data packet here may be a data packet of Packet Data Convergence Protocol (PDCP).

In one embodiment, the network side reserves a Physical Random Access Channel (PRACH) resource for the first parameter (but not used for transmitting the first parameter). When the terminal needs to report the first parameter in the MSGA/MSG3, the terminal selects a preamble or PRACH slot or MSGA resource in the reserved PRACH resource to send data, and then sends the first parameter through the Msg3.

In one embodiment, the network side carries a security parameter in a RRC Release message to the terminal, and the terminal encrypts the MSG3/MSGA according to the security parameter and sends the encrypted MSG3/MSGA to the network side. The security parameter may be a Next hop Chaining Count (NCC) parameter.

In one embodiment, when first DRB data arrives, the terminal autonomously triggers the above reporting process, where the first DRB may be configured by the network side.

Embodiment 1: The terminal reports the first parameter in the MSG3.

Step 0: The terminal determines to send the first parameter in the MSG3.

In one embodiment, the terminal determines to send the first parameter in the MSG3 according to a network-side instruction.

In one embodiment, the network-side instruction may indicate in the broadcast message whether a cell to which the terminal is attached supports the terminal to report the first parameter in the MSG3.

In one embodiment, the network-side instruction may be an instruction in the RRC Release message. When the terminal is in an IDLE state and does not leave the current cell, and/or when the terminal is in an inactive state and does not leave the RAN area, the network-side instruction is valid.

Step 1: The terminal selects a preamble and sends the selected preamble on the PRACH resource.

In one embodiment, the network side configures a preamble resource for reporting the first parameter.

In one embodiment, the network side may notify the preamble of the first parameter and the PRACH resource in the broadcast message or RRC Release message.

Step 2: The terminal receives an RAR sent by the network side.

The RAR carries the UL grant of MSG3.

The UL grant of MSG3 is calculated by the network side when determining that the terminal will send the first parameter in MSG3 according to the preamble sent by the terminal.

Step 3: After receiving the RAR, The terminal sends the first parameter in the UL grant for sending the MSG3.

The first parameter may be one or a combination of:

- a burst spread parameter, energy-saving preference of the terminal, a service cycle and a packet size, etc., where the burst spread parameter may be one or more of: delay jitter of service arrival, maximum delay of service arrival, size average of service data packet, size variance of service data packet, etc.

The energy-saving preference of the terminal may include one or a combination of: a Discontinuous Reception (DRX) parameter, bandwidth preference, a quantity of Multiple Input Multiple Output (MIMO) layers, etc.

In one embodiment, the MSG3 is encrypted and integrity protected, and a key used for encryption is calculated using the NCC configured on the network side.

In one embodiment, when the UL grant cannot bear the first parameter, that is, when a size of the UL grant is smaller than a size of the first parameter, the terminal may carry a BSR in the MSG3.

Step 4: The terminal receives an MSG4 sent by the network side.

The MSG4 includes a contention resolution Medium Access Control Control Element (MAC CE) and an RRC acknowledge message sent by the network side. If the terminal performs a RRC setup process, the network side responds with an RRC setup message; if the terminal performs a RRC resume process, the network side sends an RRC resume message.

Embodiment 2: The terminal reports a service-related parameter in the MSGA.

Step 0: The terminal determines to send the first parameter in the MSGA.

In one embodiment, the terminal determines to send the first parameter in the MSGA according to a network-side instruction.

In one embodiment, the network-side instruction may be information in the broadcast message indicating whether a cell to which the terminal is attached supports the terminal to report the first parameter in the MSGA.

In one embodiment, the network-side instruction may be an instruction in the RRC Release message. When the terminal is in the IDLE state and does not leave the current cell, and/or when the terminal is in the inactive state and does not leave the RAN area, the network-side instruction is valid.

Step 1: The terminal selects an MSGA resource and sends the selected MSGA on the selected MSGA resource.

In one embodiment, the network side configures the MSGA resource for reporting the first parameter.

In one embodiment, the network side may notify the MSGA resource of the first parameter in the broadcast message or RRC Release message.

The MSGA includes a preamble resource and a PUSCH resource, and the terminal sends on the PUSCH resource the first parameter:

- a burst spread parameter, energy-saving preference of the terminal, a service cycle and a packet size, etc.

The energy-saving preference may include: a DRX parameter, bandwidth preference, a quantity of MIMO layers, etc.

In one embodiment, the MSGA is encrypted and integrity protected, and a key used for encryption is calculated using the NCC configured on the network side.

In one embodiment, when the UL grant cannot bear the first parameter, that is, when a size of the UL grant is smaller than a size of the first parameter, the terminal may carry a BSR in the MSGA.

Step 2: The terminal receives an RAR sent by the network side. The RAR may be a fallback RAR or a success RAR.

If the RAR is a success RAR, the network side has successfully received the MSGA. Since the success RAR has already carried a Cell-Radio Network Temporary Identifier (C-RNTI) of the terminal, the terminal may use the C-RNTI to receive feedback from the network side after receiving the success RAR.

If the RAR is a fallback RAR, the fallback RAR may carry a UL grant, and the terminal sends the first parameter in the UL grant. When the size of the UL grant is inconsistent with the size of the PUSCH in the MSGA, the terminal may perform packaging again.

The feedback from the network side includes an RRC acknowledge message sent by the network side. If the terminal performs a RRC setup process, the network side responds with an RRC setup message; if the terminal performs a RRC resume process, the network side sends an RRC resume message.

Figure 6:
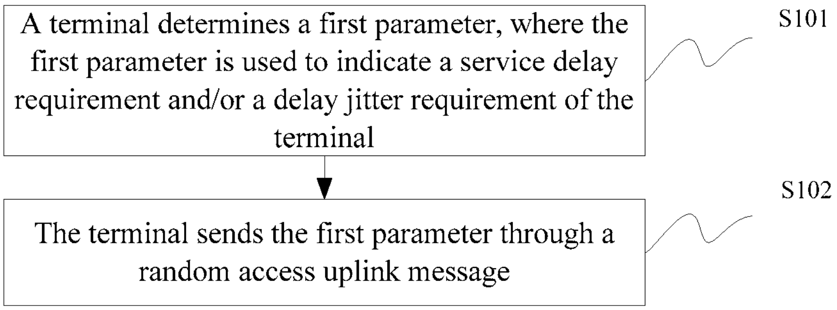
FIG. 6 is a schematic flowchart of an information communication method according to an embodiment of the present application.

To sum up, referring to FIG. 6, on the terminal side, an information communication method according to an embodiment of the present application includes following steps.

S101: a terminal determines a first parameter, where the first parameter is used to indicate a service delay requirement and/or a delay jitter requirement of the terminal.

S102: the terminal sends the first parameter through a random access uplink message.

In one embodiment, the first parameter includes one or a combination of:

burst spread, delay jitter, a service characteristic, or energy-saving preference of the terminal.

In one embodiment, the first parameter is sent when an instruction to report the first parameter sent by a network side is received, where the instruction is carried by a broadcast message or an RRC Release message.

In one embodiment, the first parameter is sent when a size of a current random access uplink message is capable of bearing the first parameter.

In one embodiment, when a size of a current random access uplink message is not capable of bearing the first parameter, the method further includes:

sending a BSR through the random access uplink message;

or, segmenting the first parameter to obtain a first parameter segment, and sending the first parameter segment through the random access uplink message;

or, sending the BSR and the first parameter segment obtained after segmenting the first parameter through the random access uplink message.

In one embodiment, before sending the first parameter, the method further includes:

when a network side reserves a PRACH resource for the first parameter, selecting a preamble or PRACH slot or MSGA resource in the reserved PRACH resource to send data.

In one embodiment, the method further includes: receiving a security parameter carried by a network side in an RRC Release message;

encrypting the random access uplink message through the security parameter, and then sending the encrypted random access uplink message to the network side.

In one embodiment, the first parameter is determined when a preset DRB arrives.

In one embodiment, the random access uplink message includes an MSG3 or MSGA.

In one embodiment, the terminal determines the first parameter in an RRC IDLE or inactive state.

Figure 7:
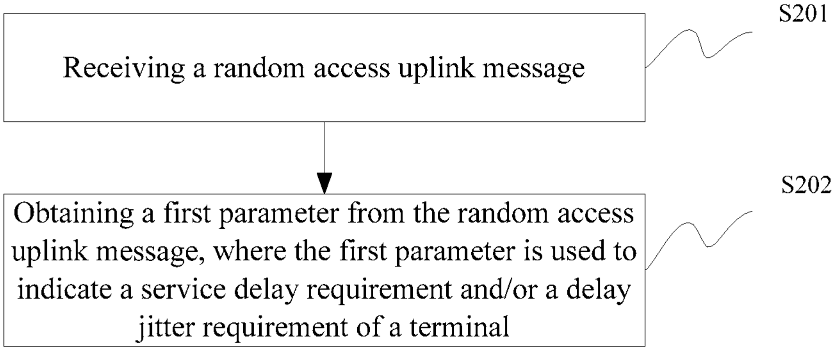
FIG. 7 is a schematic flowchart of another information communication method according to an embodiment of the present application.

Correspondingly, on the network side, referring to FIG. 7, an information communication method according to an embodiment of the present application includes following steps.

S201: receiving a random access uplink message.

S202: obtaining a first parameter from the random access uplink message, where the first parameter is used to indicate a service delay requirement and/or a delay jitter requirement of a terminal.

In one embodiment, the first parameter includes one or a combination of:

burst spread, delay jitter, a service characteristic, or energy-saving preference of the terminal.

In one embodiment, the method further includes: receiving a BSR through the random access uplink message, or receiving the BSR and a first parameter segment through the random access uplink message.

In one embodiment, the first parameter obtained from the random access uplink message is a segmented first parameter segment.

In one embodiment, the method further includes:

reserving a PRACH resource for the first parameter;

receiving data through a preamble or PRACH slot or MSGA resource in the reserved PRACH resource.

In one embodiment, the method further includes:

sending a security parameter through an RRC Release message, and the terminal encrypts the random access uplink message through the security parameter.

In one embodiment, before receiving the random access uplink message, the method further includes:

sending a preset DRB, and triggering the terminal to send the first parameter through the random access uplink message.

In one embodiment, the random access uplink message includes an MSG3 or MSGA.

Figure 8:
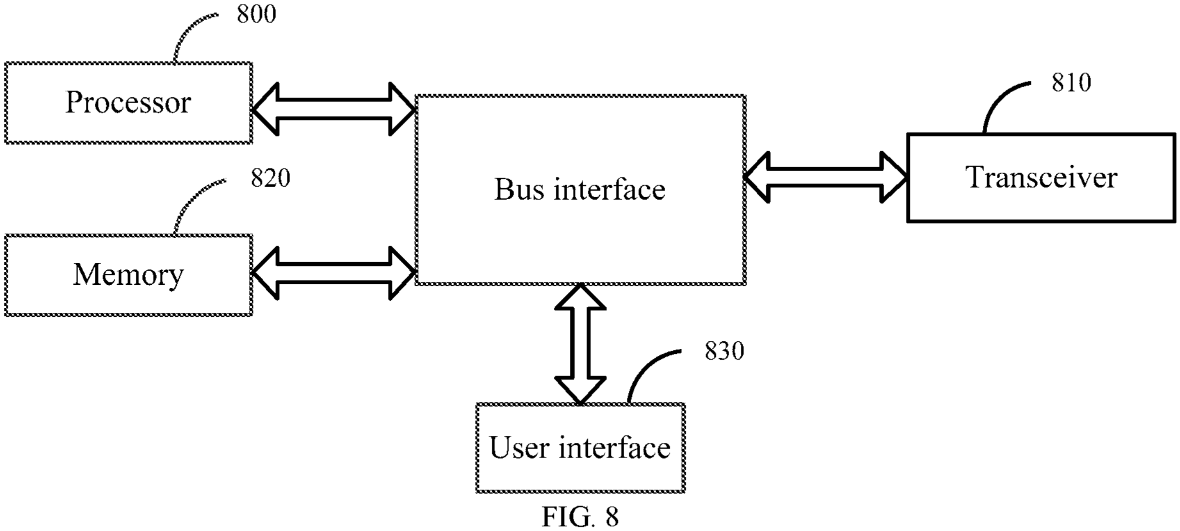
FIG. 8 is a schematic structural diagram of a first information communication apparatus according to an embodiment of the present application.

On the terminal side, referring to FIG. 8, a first information communication apparatus according to an embodiment of the present application includes: a memory 820 and a processor 800, where the memory 820 is configured to store program instructions, and the processor 800 is configured to invoke the program instructions stored in the memory 820 and perform in accordance with an obtained program:

determining a first parameter, where the first parameter is used to indicate a service delay requirement and/or a delay jitter requirement of a terminal;

sending the first parameter via a transceiver 810 through a random access uplink message.

In one embodiment, the first parameter includes one or a combination of:

burst spread, delay jitter, a service characteristic, or energy-saving preference of the terminal.

In one embodiment, the first parameter is sent via the transceiver 810 when an instruction to report the first parameter sent by a network side is received via the transceiver 810, where the instruction is carried by a broadcast message or an RRC Release message.

In one embodiment, the first parameter is sent via the transceiver 810 when a size of a current random access uplink message is capable of bearing the first parameter.

In one embodiment, when a size of a current random access uplink message is not capable of bearing the first parameter, the processor 800 is further configured to:

send a BSR via the transceiver 810 through the random access uplink message;

or, segment the first parameter to obtain a first parameter segment, and send the first parameter segment through the random access uplink message;

or, send the BSR and the first parameter segment obtained after segmenting the first parameter through the random access uplink message.

In one embodiment, before sending the first parameter via the transceiver 810, the processor 800 is further configured to:

when a network side reserves a PRACH resource for the first parameter, select a preamble or PRACH slot or MSGA resource in the reserved PRACH resource to send data via the transceiver 810.

In one embodiment, the processor 800 is further configured to: receive a security parameter carried by a network side in an RRC Release message via the transceiver 810;

encrypt the random access uplink message through the security parameter, and then send the encrypted random access uplink message to the network side via the transceiver 810.

In one embodiment, the first parameter is determined when a preset DRB arrives.

In one embodiment, the random access uplink message includes an MSG3 or MSGA.

In one embodiment, the terminal determines the first parameter in an RRC IDLE or inactive state.

The transceiver 810 is configured to receive and send data under control of the processor 800.

Here, in FIG. 8, the bus architecture may include any numbers of interconnected buses and bridges, and link various circuits of one or more processors represented by the processor 800 and the memory represented by the memory 820. The bus architecture may further link various other circuits such as a peripheral device, a voltage regulator and a power management circuit. These circuits are all well known in the art and thus will not be further described again herein. The bus interface provides an interface. The transceiver 810 may be multiple elements, i.e., include a transmitter and a receiver, and provide the units for communicating with various other devices over the transmission media. For different user equipments, the user interface 830 can also be the interface capable of inter-connecting or exter-connecting with the required devices, and the connected devices include but not limited to keypad, display, loudspeaker, microphone, joystick and the like.

The processor 800 is responsible for managing the bus architecture and general processing, and the memory 820 may store the data used by the processor 800 when performing operations.

In one embodiment, the processor 800 may be a Central Processing Unit (CPU), an Application Specific Integrated Circuit (ASIC), a Field Programmable Gate Array (FPGA) or a Complex Programmable Logic Device (CPLD).

Figure 9:
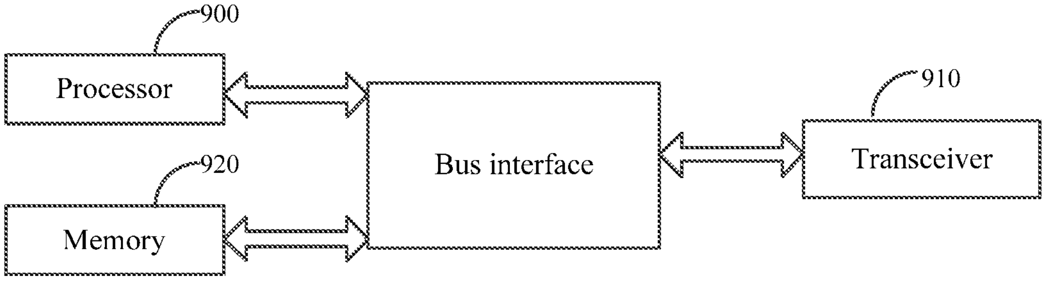
FIG. 9 is a schematic structural diagram of a second information communication apparatus according to an embodiment of the present application.

On the network side, referring to FIG. 9, a second information communication apparatus according to an embodiment of the present application includes: a memory 920 and a processor 900, where the memory 920 is configured to store program instructions, and the processor 900 is configured to invoke the program instructions stored in the memory 920 and perform in accordance with an obtained program:

receiving a random access uplink message via a transceiver 910;

obtaining a first parameter from the random access uplink message, where the first parameter is used to indicate a service delay requirement and/or a delay jitter requirement of a terminal.

In one embodiment, the first parameter includes one or a combination of:

burst spread, delay jitter, a service characteristic, or energy-saving preference of the terminal.

In one embodiment, the processor 900 is further configured to: receive a BSR through the random access uplink message, or receive the BSR and a first parameter segment through the random access uplink message.

In one embodiment, the first parameter obtained from the random access uplink message is a segmented first parameter segment.

In one embodiment, the processor 900 is further configured to:

reserve a PRACH resource for the first parameter;

receive data through a preamble or PRACH slot or MSGA resource in the reserved PRACH resource.

In one embodiment, the processor 900 is further configured to:

send a security parameter through an RRC Release message, and the terminal encrypts the random access uplink message through the security parameter.

In one embodiment, before receiving the random access uplink message via the transceiver 910, the processor 900 is further configured to:

send a preset DRB via the transceiver 910, and trigger the terminal to send the first parameter through the random access uplink message.

In one embodiment, the random access uplink message includes an MSG3 or MSGA.

The transceiver 910 is configured to receive and send data under control of the processor 900.

Here, in FIG. 9, the bus architecture may include any numbers of interconnected buses and bridges, and link various circuits of one or more processors represented by the processor 900 and the memory represented by the memory 920. The bus architecture may further link various other circuits such as a peripheral device, a voltage regulator and a power management circuit. These circuits are all well known in the art and thus will not be further described again herein. The bus interface provides an interface. The transceiver 910 may be multiple elements, i.e., include a transmitter and a receiver, and provide devices for communicating with various other devices over the transmission media. The processor 900 is responsible for managing the bus architecture and general processing, and the memory 920 may store the data used by the processor 900 when performing the operations.

The processor 900 may be a Central Processing Unit (CPU), an Application Specific Integrated Circuit (ASIC), a Field Programmable Gate Array (FPGA) or a Complex Programmable Logic Device (CPLD).

Figure 10:
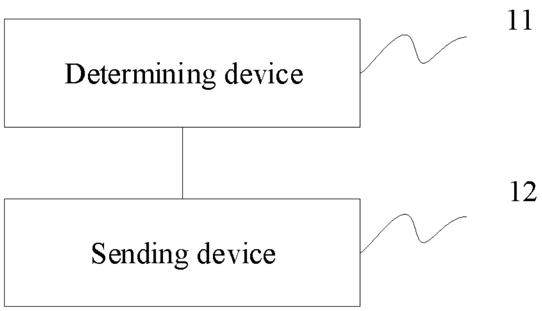
FIG. 10 is a schematic structural diagram of a third information communication apparatus according to an embodiment of the present application.

On the terminal side, referring to FIG. 10, a third information communication apparatus according to an embodiment of the present application includes:

a determining device 11 configured to determine a first parameter, where the first parameter is used to indicate a service delay requirement and/or a delay jitter requirement of a terminal;

a sending device 12 configured to send the first parameter through a random access uplink message.

The above devices may also perform other processes of the above information communication method on the terminal side, and these processes will not be repeated here.

Figure 11:
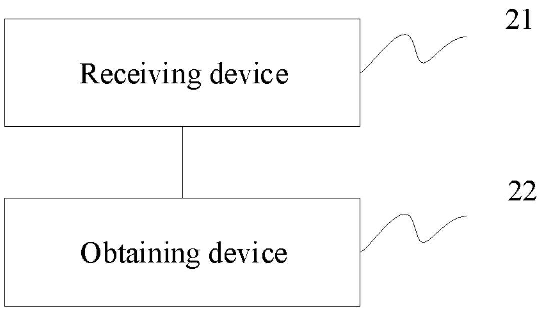
FIG. 11 is a schematic structural diagram of a fourth information communication apparatus according to an embodiment of the present application.

On the network side, referring to FIG. 11, a fourth information communication apparatus according to an embodiment of the present application includes:

a receiving device 21 configured to receive a random access uplink message;

an obtaining device 22 configured to obtain a first parameter from the random access uplink message, where the first parameter is used to indicate a service delay requirement and/or a delay jitter requirement of a terminal.

The above devices may also perform other processes of the above information communication method on the network side, and these processes will not be repeated here.

It should be noted that the division of devices in embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices may be implemented in the form of hardware, or may be implemented in the form of software functional units.

When the integrated unit is implemented in the form of software functional unit and sold or used as an independent product, it may be stored in a computer readable storage medium. Based on such understanding, the embodiments of the present application essentially or a part that contributes to the prior art or all or a part of the solution may be embodied in the form of software product. The computer software product is stored in a storage medium, and includes several instructions used to enable a computer device (may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, where the computing device may be a desktop computer, a portable computer, a smart phone, a tablet computer, a Personal Digital Assistant (PDA) or the like. The computing device may include a Center Processing Unit (CPU), a memory, input/output devices and the like. The input device may include a keyboard, a mouse, a touch screen and the like, and the output device may include a display device such as Liquid Crystal Display (LCD), Cathode Ray Tube (CRT) or the like.

The memory may include a Read-Only Memory (ROM) and a Random Access Memory (RAM), and provide the program instructions and data stored in the memory to the processor. In an embodiment of the present application, the memory may be used to store the program of any one of the methods provided by embodiments of the present application.

The processor invokes the program instructions stored in the memory and is configured to perform any one of the methods provided by embodiments of the present application in accordance with the obtained program instructions.

An embodiment of the present application provides a computer storage medium for storing the computer program instructions used by apparatuses provided by embodiments of the present application described above, where the computer storage medium includes the program for performing any one of the methods provided by embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The processing flows of the above methods may be implemented by a software program, and this software program may be stored in a storage medium. When the stored software program is invoked, the above method steps are performed.

To sum up, in embodiments of the present application, the terminal sends the first parameter to the network side through the MSG3/MSGA in advance, to reduce the service delay.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory capable of guiding the computer or another programmable data processing device to operate in a particular way, and the instructions stored in the computer readable memory produce a manufacture including an instruction apparatus, where the instruction apparatus implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. An information communication method, comprising:

determining, by a terminal, a first parameter comprising a burst spread parameter according to a network-side instruction;

sending, by the terminal, the first parameter through a random access uplink message before entering a radio resource control connected state;

wherein the network-side instruction indicates in a broadcast message whether a cell to which the terminal is attached supports the terminal to report the first parameter; or wherein the network-side instruction is an instruction in a Radio Resource Control, RRC, Release message; when the terminal is in an idle state and does not leave a current cell, and/or, when the terminal is in an inactive state and does not leave a random access network area, the network-side instruction is valid;

wherein the random access uplink message comprises a mapping between Logical Channel, LCH, information and the first parameter, or a mapping between Data Resource Bearer, DRB, information and the first parameter;

wherein the terminal determines the first parameter in an RRC idle state or inactive state;

wherein the first parameter is sent when a size of a current random access uplink message is capable of bearing the first parameter;

wherein when a size of a current random access uplink message is not capable of bearing the first parameter, the method further comprises:

sending a Buffer Status Report, BSR, through the random access uplink message;

or, segmenting the first parameter to obtain a first parameter segment, and sending the first parameter segment through the random access uplink message;

or, sending the BSR and the first parameter segment obtained after segmenting the first parameter through the random access uplink message.

2. The method according to claim 1, wherein the first parameter further comprises one or a combination of:

delay jitter, a service characteristic, or energy-saving preference of the terminal.

3. The method according to claim 1, wherein the random access uplink message is a Medium Access Control Control Element, MAC CE, or a Radio Resource Control, RRC, message;

wherein the random access uplink message comprises a Message 3, MSG3, or an MSGA.

4. The method according to claim 1, wherein before sending the first parameter, the method further comprises:

when a network side reserves a Physical Random Access Channel, PRACH, resource for the first parameter, selecting a preamble or PRACH slot or Message A, MSGA, resource in the reserved PRACH resource to send data;

the method further comprising: receiving a security parameter carried by a network side in an RRC Release message;

encrypting the random access uplink message through the security parameter, and then sending the encrypted random access uplink message to the network side;

wherein the first parameter is determined when a preset DRB arrives.

5. An information communication apparatus, comprising a memory and a processor, wherein the memory is configured to store program instructions, and the processor is configured to read the program instructions in the memory and perform operations of the method of claim 1.

6. The apparatus according to claim 5, wherein the first parameter further comprises one or a combination of:

delay jitter, a service characteristic, or energy-saving preference of the terminal.

7. The apparatus according to claim 5, wherein before sending the first parameter, the processor is further configured to:

when a network side reserves a Physical Random Access Channel, PRACH, resource for the first parameter, select a preamble or PRACH slot or Message A, MSGA, resource in the reserved PRACH resource to send data.

8. The apparatus according to claim 5, wherein the random access uplink message comprises a Message 3, MSG3, or Message A, MSGA.

9. An information communication method, comprising:

receiving a random access uplink message sent by a terminal before entering a radio resource control connected state;

obtaining a first parameter comprising a burst spread parameter from the random access uplink message;

wherein the first parameter is determined according to a network-side instruction;

wherein the network-side instruction indicates in a broadcast message whether a cell to which the terminal is attached supports the terminal to report the first parameter; or wherein the network-side instruction is an instruction in a Radio Resource Control, RRC, Release message; when the terminal is in an idle state and does not leave a current cell, and/or, when the terminal is in an inactive state and does not leave a random access network area, the network-side instruction is valid;

wherein the random access uplink message comprises a mapping between Logical Channel, LCH, information and the first parameter, or a mapping between Data Resource Bearer, DRB, information and the first parameter;

wherein the first parameter is determined by the terminal in an RRC idle state or inactive state;

wherein the method further comprises:

receiving a Buffer Status Report, BSR, through the random access uplink message, or receiving the BSR and a first parameter segment through the random access uplink message; or wherein the first parameter obtained from the random access uplink message is a segmented first parameter.

10. The method according to claim 9, wherein the first parameter further comprises one or a combination of:

delay jitter, a service characteristic, or energy-saving preference of the terminal.

11. The method according to claim 9, further comprising:

reserving a Physical Random Access Channel, PRACH, resource for the first parameter;

receiving data through a preamble or PRACH slot or Message A, MSGA, resource in the reserved PRACH resource;

the method further comprising:

sending a security parameter through a Radio Resource Control, RRC, Release message, so that the terminal encrypts the random access uplink message through the security parameter, wherein before receiving the random access uplink message, the method further comprises:

sending a preset Data Resource Bearer, DRB, and triggering the terminal to send the first parameter through the random access uplink message.

12. The method according to claim 9, wherein the random access uplink message comprises a Message 3, MSG3, or Message A, MSGA;

wherein the random access uplink message is a Medium Access Control Control Element, MAC CE, or a Radio Resource Control, RRC, message.

13. An information communication apparatus, comprising a memory and a processor, wherein the memory is configured to store program instructions, and the processor is configured to invoke the program instructions stored in the memory and perform operations of the method of claim 9.

14. The apparatus according to claim 13, wherein the first parameter further comprises one or a combination of:

delay jitter, a service characteristic, or energy-saving preference of the terminal;

wherein the random access uplink message comprises a Message 3, MSG3, or Message A, MSGA.

* * * * *